United States Patent [19]
Hargraves

[11] 3,985,154
[45] Oct. 12, 1976

[54] FOUR-WAY VALVE

[75] Inventor: David P. Hargraves, Webster Groves, Mo.

[73] Assignee: Emerson Electric Co., St. Louis, Mo.

[22] Filed: Oct. 24, 1975

[21] Appl. No.: 625,585

[52] U.S. Cl. .............................. 137/625.29; 251/31
[51] Int. Cl.² ................. F16K 11/07; F16K 31/124
[58] Field of Search ................. 137/625.29; 251/30, 251/31

[56] References Cited
UNITED STATES PATENTS

| | | | |
|---|---|---|---|
| 2,933,107 | 4/1960 | Wiegers | 137/625.29 |
| 3,036,807 | 5/1962 | Lucky et al. | 251/31 X |
| 3,037,525 | 6/1962 | Wiegers | 137/625.29 |

*Primary Examiner*—Arnold Rosenthal
*Attorney, Agent, or Firm*—Polster and Polster

[57] ABSTRACT

A four-way valve assembly is provided which includes a main valve member operable by pilot valve actuation. A particular feature of the construction of the valve assembly is that the main valve member stroke length may vary over a relatively wide range, enabling the valve to be produced in a variety of sizes, without affecting the pilot valve operation. The main valve member includes a first side and a second side. The first side of the main valve member has a hollow formed in it, while the second side has a flat area formed in it. The flat area is utilized to mount a pilot assembly to the valve. Means for operating the valve assembly are operatively connected to the pilot assembly so as to permit the pilot assembly to move with the main valve while the operating means remains stationary. All connections required for operation of the main valve are carried internally of a valve enclosure.

15 Claims, 11 Drawing Figures

FOUR-WAY VALVE

BACKGROUND OF THE INVENTION

This invention relates to four-way valves, especially of the type used in reverse cycle refrigeration systems. While the invention is described in particular detail with respect to such refrigeration systems, those skilled in the art will recognize the applicability of the invention to other uses and systems.

In refrigeration systems where the valve of this invention has utility, for example, it is common to connect a first condenser-evaporator coil, a second condenser-evaporator coil, and appropriate expansion devices to a single refrigerant compressor through the valve. The first coil ordinarily is an outdoor coil for condensing the compressor refrigerant, and the second coil is an inside coil for refrigerating the interior of an enclosure such as a room or other space. In heat pump applications, the function of the first and second coils can be reversed, making the indoor coil the condenser to heat the space and the outdoor coil the evaporator to absorb heat from the outside. Four-way valves permit easy change over between the functions of the first and second coils.

A number of four-way or piston slide valves are known in the art. In general, prior art valves have had rather complicated structure, often requiring tubing connections external of a main valve enclosure in order to accomplish valve operation. Often, the pilot valve assembly components are mounted externally of the main valve housing. Where the pilot valve assembly components have been positioned internally of the housing, their structure has increased the size of the housing, or imposed design limitations on the length of the main valve stroke. For example, conventional solenoids commonly are used for pilot valve activation. Designs for prior art valves have been relatively inflexible because the plunger of the solenoid requires some predetermined movement capability. The movement required for solenoid plunger operation, alone or in combination with known pilot valve assembly constructions, has limited the length of the main valve stroke.

The invention disclosed hereinafter eliminates these prior art difficulties by providing an improved, lowcost valve structure in which a pilot valve assembly is carried by and is movable with a main slide member. Means for operating the pilot valve assembly are operatively connected to that assembly, but the operating means and the pilot valve assembly are arranged so that the distance of the main valve movement may be increased or decreased appreciably, without affecting operating of the means utilized to actuate the pilot valve assembly. As indicated, the operating means commonly is a conventional solenoid. Because the valve design disclosed hereinafter incorporates a constant pilot stroke length, a single model solenoid may be utilized for a variety of pilot operated slide valves, individual ones of which have differing distance of travel for the main valve assembly.

One of the objects of this invention is to provide a four-way valve having simplified construction.

Another object of this invention is to provide a low-cost four-way valve.

Still another object of this invention is to provide a four-way valve having a main slide valve assembly, the stroke distance of which is independent of the stroke length of a solenoid device used to actuate the valve.

Yet another object of this invention is to provide a variety of four-way valve designs having different stroke lengths for the main slide valve assembly, but which employ a common solenoid actuating means.

Yet another object of this invention is to provide a pilot operated four-way control valve which is contained within the main valve enclosure but which does not limit movement of the main valve.

Still another object of this invention is to provide a four-way valve assembly which eliminates the necessity of any external tubular connections for proper valve operation.

Other objects of this invention will be apparent to those skilled in the art in light of the following description and accompanying drawing.

SUMMARY OF THE INVENTION

In accordance with this invention, generally stated, a four-way valve assembly includes a housing having a main valve member slidably mounted in it. A pilot assembly is attached to and is movable with the main valve member. The main valve member has a plurality of channels in it adapted to connect opposite ends of the valve member to high or low pressure, depending upon the position of the pilot valve assembly. The pilot valve assembly includes a pilot driver plate. The pilot driver plate is operatively connected between the pilot valve assembly and a solenoid. The driver plate and solenoid are arranged so that the distance of the main valve travel does not affect solenoid operation. Working lines are attached to the housing. The position of the main valve within the housing determines the relationship of the working lines with pressure areas within the housing.

DESCRIPTION OF THE PREFERRED EMBODIMENT

Figure 1:
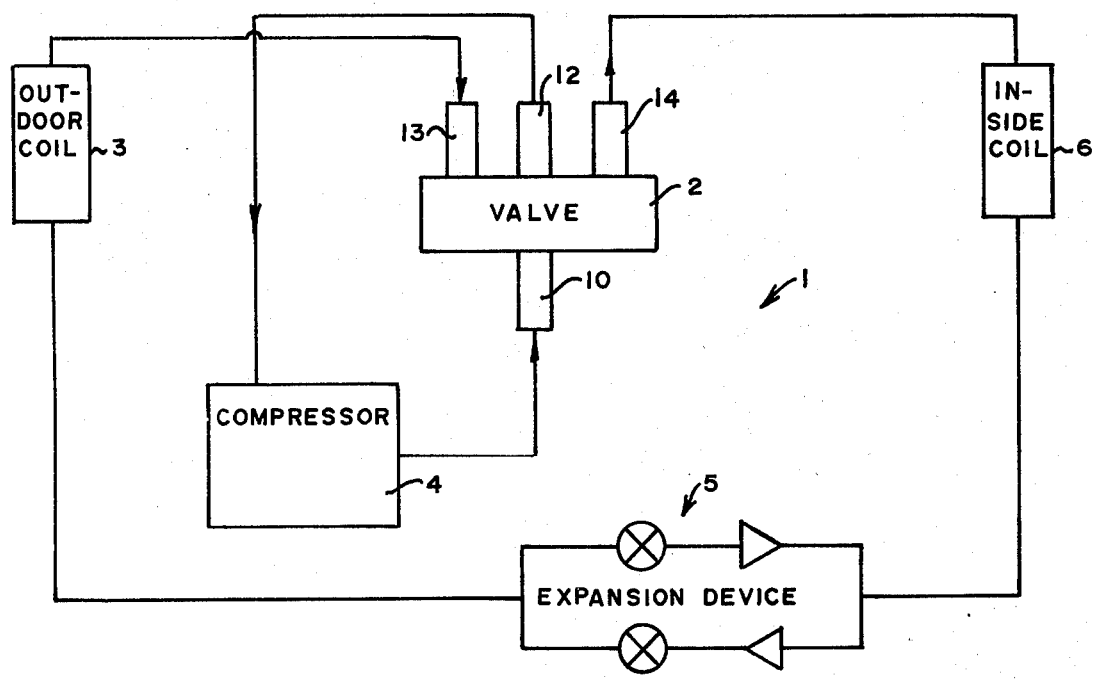
FIG. 1 is a block diagrammatic representation of a refrigeration system in which the valve of this invention has utility.
Figure 2:
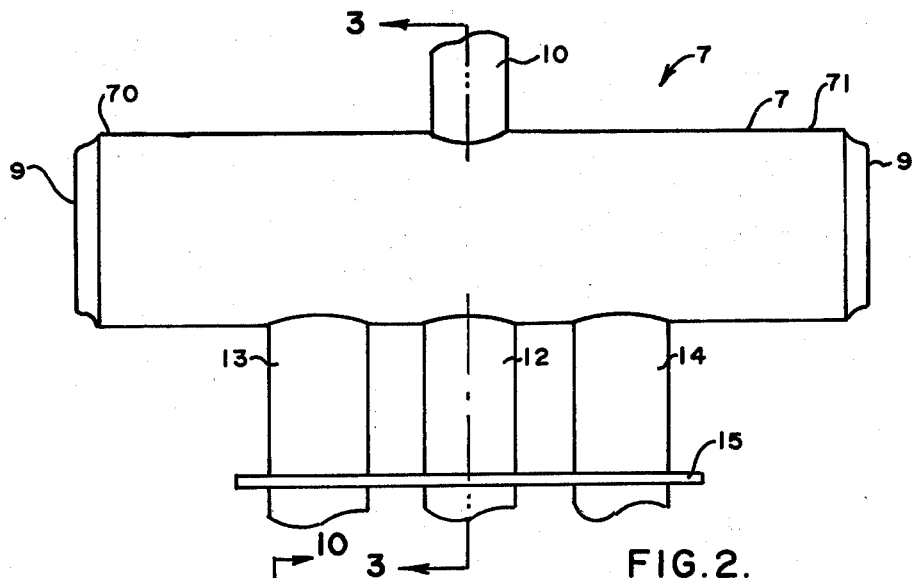
FIG. 2 is a top plan view, partly broken away, of valve of this invention.
Figure 3:
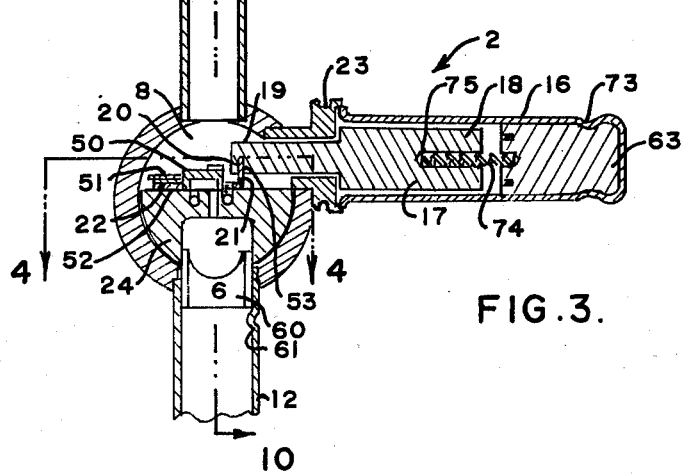
FIG. 3 is a sectional view, partly broken away, taken along the line 3—3 of FIG. 2.
Figure 4:
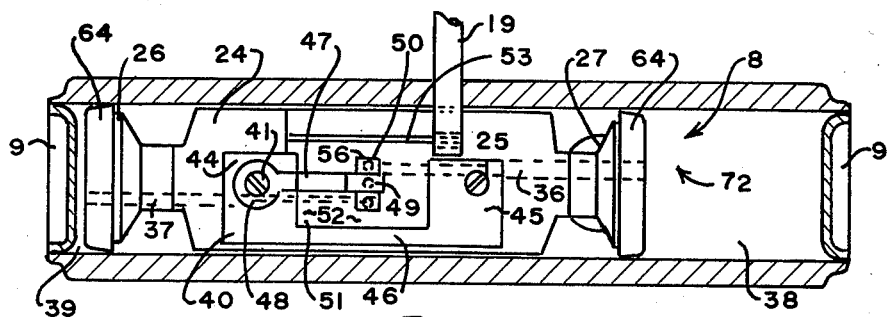
FIG. 4 is a sectional view taken along the line 4—4 of FIG. 3.
Figure 5:
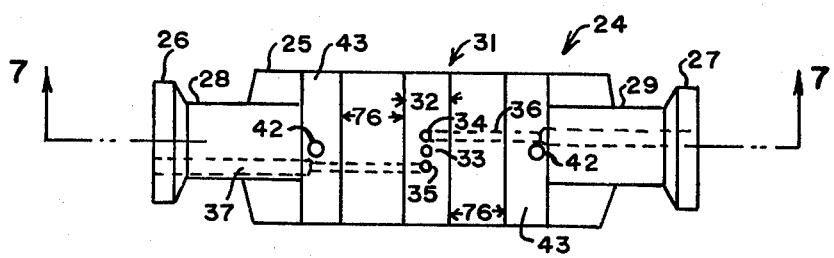
FIG. 5 is a plan view of a first side of a main valve member utilized in conjunction with the valve of FIG. 2.

Referring now to FIG. 1, reference numeral 1 indicates a refrigeration system employing one illustrative embodiment of valve 2 of this invention. The particular refrigeration system shown in FIG. 1 is a reverse cycle refrigeration apparatus including a compressor 4, a first condenser-evaporator coil 3, appropriate expansion devices and check valves 5, and a second condenser-evaporator coil 6, which is interconnected to the compressor 4 through the valve 2. In the system 1, the coil 3 ordinarily is an outdoor coil for condensing the compressor refrigerant, and the coil 6 is an inside coil for refrigerating the interior of an enclosure such as a room or other space. The system 1 can reverse the function of the two coils, through the action of the valve 2, making the coil 6 the condenser to heat the space and the coil 3 the evaporator to absorb heat from the outside. Heat pump systems of the type just described are well known.

The valve 2, shown in greater detail in FIGS. 2 through 11, has a generally cylindrical housing 7, having a first end 70 and a second end 71. The housing 7 also has a longitudinal opening 8 through it between the ends 70 and 71. Each of the ends 70 and 71 are closed by a suitable end cap 9, as may be seen best in FIGS. 2 and 4. The end caps 9 are attached to the housing 7 by any convenient means. Welding works well, for example. After attachment, the housing 7 and end caps define a cavity 72. The housing 7 has a high pressure inlet pipe 10 entering it midway between its ends. A low-pressure outlet pipe 12 extends outwardly from the housing 7 on a diametrically opposite side of the inlet pipe 10. The inlet and outlet each communicate with the cavity 72. A pair of working lines 13 and 14 also are attached to the housing 7 and are aligned with the outlet pipe 12, lying outboard of it. It is conventional to provide a support 15 as an aid in maintaining a relatively rigid structure for the pipe 12, working lines 13 and 14. The housing 7 may be constructed from stock tubing, and the various pipes and working lines 10, 12, 13 and 14, respectively, may be inserted into appropriately drilled openings in the wall of the housing 7, and soldered into position. The lengths of the several pipes will depend upon the particular application of the valve 2.

A solenoid assembly, not shown, also is mounted to the housing 7. The solenoid assembly includes a tube 16 having a plunger 17 movably mounted in it. The tube 16 has a closed first end and a flared second end. The closed end of the tube 16 has a plug 63 inserted in it, which is held positionally by a crimp 73 in the tube 16. It is conventional to place a spring 74 between the plug 63 and the plunger 17 so as to exert a force on the plunger 17 in some predetermined direction. The electrical portion of the solenoid assembly structure is conventional and is not shown for drawing simplicity. The solenoid assembly may be attached to the housing 7 by suitable connection means, indicated generally by the numeral 23 in FIG. 3. The plunger 17, in the embodiment illustrated, has a first end 18 and a smaller diameter, second end 19. The end 19 extends into the cavity 72 of the housing 7. The end 19 has a notch 20 formed in it which receives a leg 21 of a pilot driver plate 22, described in detail hereinafter. The end 18 of the plunger 17 commonly has an opening 75 in it which receives an end of the spring 74.

Figure 6:
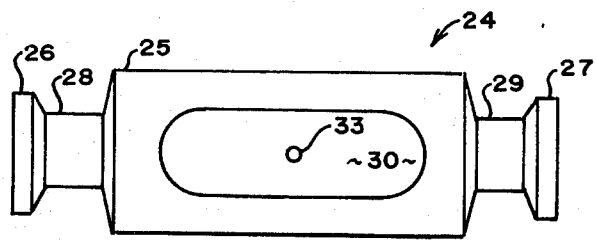
FIG. 6 is a plan view of the side opposite the side of the main valve member shown in FIG. 5.
Figure 7:
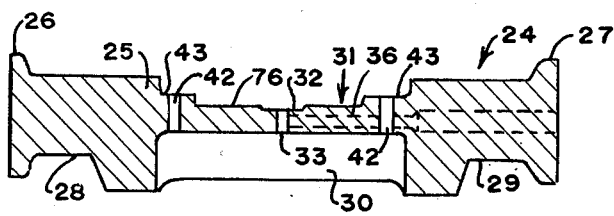
FIG. 7 is a sectional view taken along the line 7—7 of FIG. 5.

A main valve member 24 is movably mounted in the cavity 72 of the housing 7. The valve member 24 includes a body part 25 having a first end 26 and a second end 27, respectively, joined to the body part 25 along a reduced diameter connection portion 28 and a reduced diameter connection portion 29. The valve member 24 generally is cylindrical in silhouette, but has a hollow 30 formed on a first side of the body 25, and a flat 31 formed on a diametrically opposite side of the body 25. The hollow 30, best seen in FIGS. 6 and 7, is an oblong opening extending along the axial length of the body 25. The axial length of the hollow 30 is determined in part by the stroke length of the main valve member 24 and the spacing between respective ones of the pipes 13, 14 and outlet 12.

The flat 31 is formed by any suitable method and has a central portion 32 which is indented with respect to a broader area 76. The purpose of the central portion 32 is described hereinafter. The central portion of the flat 31 has an opening 33 in it, which extends through the body 25 between the central portion 32 and the hollow 30. The central portion 32 also has a pair of openings 34 and 35, respectively, extending inwardly of the body 25. Body 25 has a channel 36 and a channel 37 formed in it. The opening 34 connects the flat side 31 of the main valve 24 to the end 27 of the body 25 along the channel 36, while the opening 35 connects the flat side 31 of the main valve 24 to the end 26 of the body 25 along the channel 37. The opening 33 is centrally located with respect to the openings 34 and 35, and the three openings are aligned axially, as is best observed in FIG. 5.

The ends 26 and 27 of the valve member 24 define respective first and second opposed chambers 38 and 39 with the housing 7. Each of the ends 26 and 27 may be fitted with suitable sealing devices, indicated generally by the numeral 64, which permit movement of the main valve 24 while maintaining a proper seal at the chambers 38 and 39. The devices 64 may be mounted to the ends 26 and 27 of the valve member 24 by any convenient method. Insertion of a threaded stem into suitable openings in the ends 26 and 27, the stems being attached to the devices 64, works well, for example.

A pilot keeper plate 40 is mounted to the main valve member 24 adjacent to the flat 31 by conventional fasteners 41. The fasteners 41 are inserted in a pair of openings 42 which may be drilled or otherwise formed in a lip 43 along two opposed ends of the flat 31. Lip 43 is spaced vertically, vertically being referenced to FIG. 7, from the flat 31. Keeper plate 40 is U-shaped in plan, having a first leg 44, a second leg 45, and a connection portion 46. The legs 44 and 45 have a relatively wide width which extends longitudinally across a part of the area 76 of the flat 31. That portion of the legs 44 and 45 extending over the area 76 of the flat 31 is parallel to the flat 31 and is spaced from the flat 31 for a distance corresponding to the vertical spacing between the lip 43 and the flat 31.

A pilot hold-down spring 47 is mounted to the main valve 24 on the flat 31 side of the valve. The spring 47 is an elongated member having a first end 48 and a second end 49. The end 48 is enlarged and is adapted to receive the fastener 41. Fastener 41 secures the spring 47 to the main valve. The end 49 of the spring 47 is free, the spring 47 acting cantilever fashion to exert a force on a pilot slide means 50. Pilot slide means 50 is shown in and later described in particular detail with respect to FIGS. 8 and 9.

A pilot driver plate 51 is mounted to the main valve 24 inboard of the keeper plate 40. The pilot driver plate 51 is carried along the flat 31 portion of the valve member 24, between the edges of the lip 43 in a loose, movable fit. The pilot driver plate 51 is prevented from outward movement, as referenced to FIG. 4, by the pilot keeper plate 40. Pilot driver plate 51 is L-shaped in cross section, and includes a first surface 52 and a second surface 53, the surfaces generally being at right angles to one another. The surface 53 has a relatively small width dimension as compared to its length dimension. The small width dimension enables the notch 20 in the end 19 of the plunger 17 to engage the surface 53. That is, the plunger 17 is operatively connected to the driver plate 51 through the interconnection of the surface 53 with the notch 20. As indicated, the pilot driver plate is freely movable along the flat 31. Consequently, the movement of the plunger 17 will cause a corresponding movement of the driver plate 51.

Figure 8:
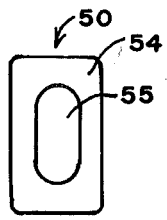
FIG. 8 is a top plan view of a pilot slide utilized in conjunction with the valve shown in FIG. 4.
Figure 9:
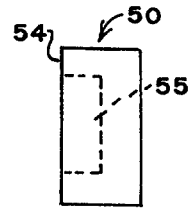
FIG. 9 is a view in side elevation of the pilot slide shown in FIG. 8.

The pilot slide means 50, shown in FIGS. 8 and 9, generally is rectangular in plan. Slide means 50 has a first side 54 having a channel 55 formed in it. The pilot driver plate 51 has a central opening 56 in the surface 52 side of it, which is sized to receive the pilot driver means 50 in a loose fit. As previously indicated, the openings 33, 34 and 35 are aligned with one another. The spring 47 retains the pilot slide means 50 within the opening 56 of the pilot driver plate in all positions of the pilot slide means and against the central portion 32 of the flat 31. The channel 55 is sized so that it may communicate with one of the opening pairings 33 and 34 or 33 and 35, depending upon the position of the pilot driver plate 51.

The main slide valve 24 is prevented from rotating within the cavity 72 by a stopper 60, which is operatively connected between the outlet 12 and the hollow 30. Stopper 60 position, in turn, is maintained by a crimp 61 in the outlet 12. Other techniques for positioning and holding the position of the main valve members are compatible with the broader aspects of our invention.

Operation of the valve 2 of this invention is relatively simple to understand. The valve may be connected, for example, in a refrigeration system having a condenser-evaporator, and an evaporator-condenser, with the usual interconnections therebetween. When such a combination is provided for reverse cycle or heat pump operation, the condenser alternates as an evaporator, and the evaporator alternates as a condenser. As discussed above, this broad structural combination is known in the art. In heat pump or reverse cycle refrigeration applications, the high pressure inlet pipe 10 is connected to the outlet side of the compressor 4 so that it will obtain high pressure refrigerant. The outlet pipe 12 is connected back to the compressor 4. The working line 13 is attached to one condenser-evaporator and the working line 14 is attached to the other evaporator-condenser. It thus may be observed that high pressure normally is admitted constantly to the flat 31 side of the main valve 24, as well as along the connecting portions 28 and 29 of the main slide 24, along spaces 56, best seen in FIG. 10. When the main slide valve 24 is in the extreme left position, referenced to FIG. 10, inlet 10 is connected to the working line 14 through one of the areas 56, and the working line 13 is connected to the outlet 12 via the hollow 30. When the main slide valve 24 is in the extreme right position, again referenced to FIG. 10, inlet 10 is connected to the working line 13 through one of the areas 56, and working line 14 is connected to outlet 12 via the hollow 30.

The main slide 24 is positioned either left or right by the action of the pilot slide means 50. Pilot slide means 50 directs high pressure to one end of the main slide valve 24 while exhausting pressure from the opposite end of the main slide valve 24 to the relatively low pressure region of the main slide hollow 30. When the pilot slide means 50 is in its down position, down being referenced to FIG. 4, the chamber 38 is connected to the high pressure region through the channel 36 and the opening 34. High pressure always is present on the flat side 31 of the main slide valve 24. The indentation 32 provides a means for porting pressure from the high pressure flat 31 side to the opening 34. The high pressure finds its way to the opening 34 through the clearance between the bottom of the indentation 32 and the pilot driver plate 51. The end 26 of the main slide valve 24 is connected to the low pressure region of the hollow 30 via the channel 37 in the main slide valve 24 and the opening 35, opening 33 interconnection provided by the pilot slide means 50. This will cause the main slide valve 24 to move to the left, the position shown in FIG. 10. When the pilot driver plate 51 is raised upwardly, upwardly being referenced to FIG. 4, by the action of the plunger 17, chamber 38 is connected to the low pressure region in the hollow 30 via the channel 36 in the main slide valve 24 and the opening 34, opening 33 interconnection provided by the pilot slide means 50. Opening 35 now is connected to the inlet 10 and high pressure flows through the indentation 32 and the channel 37 to the end 26 or chamber 39 side of the main valve 24. High pressure in the chamber 39 and corresponding relatively low pressure in the chamber 39 causes the main slide valve to move to the right.

The operational connection of the surface 53 with the end 19 of the plunger 17 permits free movement of the main slide valve 24. The same interconnection, however, means that the distance of travel for the plunger 17 required to position the pilot slide means 50 remains constant, regardless of the distance of travel required by the main slide valve 24. Consequently, the stroke of the main slide valve is variable independently of the plunger 17 distance of travel. In addition, all tubular connections for pilot operation are contained within the housing 7 structure.

Figure 11:
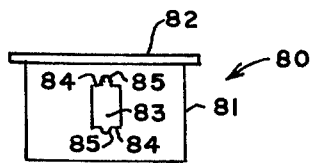
FIG. 11 is a view in front elevation of a second illustrative embodiment of a pilot driver plate compatible with the valve of this invention.
Figure 10:
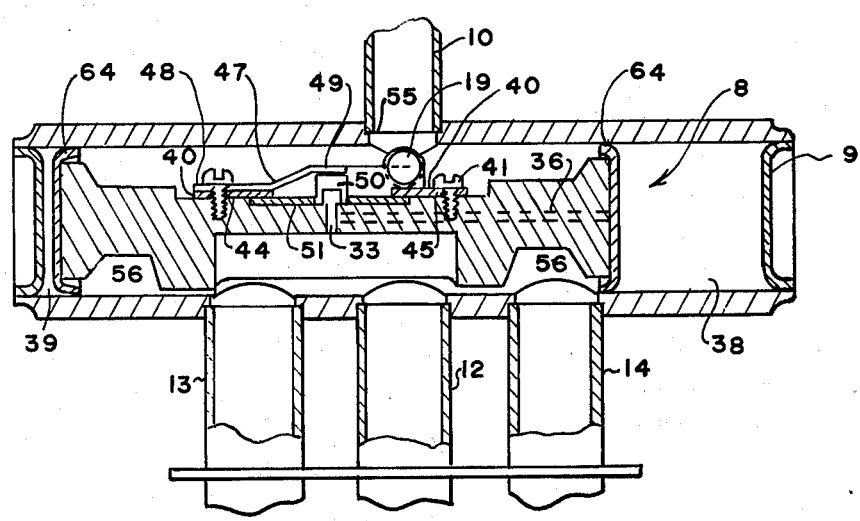
FIG. 10 is a sectional view taken along the line 10—10 of FIG. 3.

Numerous variations, within the scope of the appended claims, will be apparent to those skilled in the art in light of the foregoing description and accompanying drawings. Thus, the design silhouette of the valve 2 may vary. In like manner, design of the main slide valve 24 may be changed. While particular shapes, sizes and materials were described in conjunction with the embodiment illustrated in the drawings, one or more of these features may be altered in other embodiments, if desired. Although the indentation along the central portion is used for porting purposes in the preferred embodiment, the indentation may be eliminated when additional or enlarged openings are placed in the pilot driver plate 51. Such a driver plate design is shown in FIG. 11 of the drawings. As there shown, a driver plate 80 has a first surface 81 and a second surface 82, generally perpendicular to the surface 81. The surface 81 has a rectangular opening 83 through it. The opening 83 has a pair of opposed sides 84, and the opening 83 is enlarged at 85 to enhance high pressure passage. However, the use of the indentation, for example, assures proper valve operation and is preferred for that reason. These variations are merely illustrative.

Having thus described the invention, what is claimed and desired to be secured by Letters Patent is:

1. A valve assembly comprising:

a housing having a cavity in it, said housing having an outlet and two working lines on a first side of it, and an inlet on a side opposite said outlet and said two working lines;

a main valve member disposed in said cavity and being axially movable therein, said valve member having opposed piston ends which cooperated with said housing to define a pair of opposed chambers in said housing, said valve member having an intermediate section, said intermediate section having a first side and a second side, said first side having a hollow formed in it, said second side including a flat area, said flat area having a plurality of openings formed in it, said opening plurality including a first, a second, and a third opening predeterminedly spaced with respect to one another, said second opening communicating with said hollow, said valve member having a pair of channels formed in it, one each of said channels extending between one of said first and third openings in said flat area and an end of said valve member so that respective ones of said first and third openings communicate with respective ones of said opposed chambers;

a pilot driver plate movably mounted along the flat of said main valve member, said pilot driver plate having a first surface, said first surface having an opening in it, said opening being aligned with the three predeterminedly spaced ones of said opening plurality in said main valve member;

pilot slide means mounted in the opening of said pilot driver plate, said pilot slide means including means for interconnecting said second opening with one of said first and third openings in said main valve member;

means for holding said pilot slide in position within the opening of said pilot driver plate;

means for maintaining said pilot driver plate in position along the flat side of said main valve member; and means for moving said pilot driver plate between at least a first position and a second position, said pilot slide means moving in response to movement of said pilot driver plate so as to alternate the interconnection of said second opening with one of said first and third openings in said main valve member.

2. The valve assembly of claim 1 wherein said flat has a central indentation formed in it, said opening plurality being positioned along said indentation.

3. The valve assembly of claim 2 wherein said pilot driver plate includes a second surface approximately normal to said first surface, said moving means including a plunger having a first end operatively connected to said second surface such that said operation of said moving means remains constant regardless of the position of the main valve member.

4. The valve assembly of claim 1 wherein said pilot driver plate includes a second surface approximately normal to said first surface, said opening in said first surface being a generally rectangular shape and enlarged along two opposite sides of said rectangular shape.

5. The valve assembly of claim 3 wherein said holding means comprises a spring member mounted cantilever fashion to said main valve member, said spring being adapted to exert a force on said pilot slide means.

6. A valve assembly comprising:

a housing having a cavity in it, said housing having an inlet, an outlet, and a pair of working lines connected to it and communicating with said cavity;

a main valve member movably mounted in said cavity and adapted to connect the outlet and inlet of said valve selectively to said working lines, said valve member having ends which cooperate with said housing to define a pair of opposed chambers in said housing, and an intermediate section having a first side and a second side, said first side having a hollow formed in it, said second side including a flat area, said intermediate section having a plurality of openings formed in it along said flat area, a first one of said opening plurality communicating with said hollow, said intermediate section also having a pair of channels constructed in it, one of said channels extending between a second one of said openings and the first end of said main valve member, and the other of said channels extending between a third one of said openings and the second end of said main valve member;

a pilot driver plate movably mounted along the flat area of said main valve member, said pilot driver plate having a first surface, said first surface having an opening in it, said opening being aligned with the opening plurality of said main valve member;

pilot slide means mounted in the opening of said pilot driver plate, said pilot slide means including means for interconnecting said first opening with another of said second and third openings in said main valve member;

means for holding said pilot slide in position within said opening;

means for maintaining the location of said pilot driver along the flat area of said main valve member; and means for moving said pilot driver plate between at least a first position and a second position, said pilot slide means moving in response to movement of said pilot driver plate.

7. The valve assembly of claim 6 wherein said flat area has a central indentation formed in it, said opening plurality being positioned along said indentation.

8. The valve assembly of claim 7 wherein said pilot driver plate includes a second surface approximately normal to said first surface, said moving means including a plunger having a first end operatively connected to said second surface.

9. The valve assembly of claim 6 wherein said pilot driver plate includes a second surface approximately normal to said first surface, said opening in said first surface being of a generally rectangular shape and enlarged along two opposite sides of said rectangular shape.

10. The valve assembly of claim 8 wherein said holding means comprises a spring member mounted cantilever fashion to said main slide means, said spring being adapted to exert a force on said pilot means.

11. The valve assembly of claim 10 wherein said pilot slide means comprises a generally rectangular member having a first side, said first side having an elongated opening formed in it, said elongated opening having major and minor axes, the major axis of said opening being of sufficient length to enable said opening to cover said first and one of said second and third openings in said main slide member.

12. In a four-way valve including a housing having a cavity in it, an inlet, an outlet and a pair of working lines connected to said housing and communicating with said cavity, and a main valve member slidably mounted in said cavity, said main valve member having a predetermined but variable stroke length, the improvement of which comprises means for actuating said valve by a constant stroke device regardless of the stroke length of said main valve member, said activating means comprising a pilot driver plate movably mounted to said main valve member, said pilot driver plate having a first surface and a second surface, said first surface having an opening in it, a pilot slide means movably mounted with said pilot driver plate, said pilot slide means being positioned in the opening of said pilot driver plate, said pilot slide means adapted to direct a pressure differential to alternate ones of opposed ends of said main slide member, and plunger means adapted to move said pilot driver plate between at least first and second positions, the second surface of said pilot driver plate and said plunger being slidably engagable with one another so that said plunger actuates said pilot driver plate regardless of main valve position and stroke length.

13. The improvement of claim 12 wherein said activating means is further characterized by means for holding said pilot slide in position within said opening of said pilot driver plate, said holding means comprising a spring mounted centilever fashion to said main valve member and adapted to exert a force on said pilot slide means.

14. The improvement of claim 13 wherein said main valve member has a first side and a second side, said first side having a hollow formed in it, and said second side having a flat area diametrically opposed from said hollow, said flat area having a central indentation formed in it.

15. The improvement of claim 13 wherein the opening in the first surface of said pilot driver plate has a generally rectangular shape, said rectangular shape being enlarged along two opposite sides of said shape.

* * * * *